United States Patent
Abanades Garcia et al.

(10) Patent No.: US 9,651,252 B2
(45) Date of Patent: May 16, 2017

(54) SYSTEM FOR $CO_2$ CAPTURE FROM A COMBUSTION FLUE GAS USING A $CAO/CACO_3$ CHEMICAL LOOP

(71) Applicant: Consejo Superior De Investagaciones Cientificas, Madrid (ES)

(72) Inventors: Juan Carlos Abanades Garcia, Madrid (ES); Borja Arias Rozada, Madrid (ES); Maria Elena Diego de Paz, Madrid (ES); Isabel Martinez Berges, Madrid (ES)

(73) Assignee: Consejo Superior de Investigaciones, Madrid (ES)

( * ) Notice: Subject to any disclaimer, the term of this patent is extended or adjusted under 35 U.S.C. 154(b) by 501 days.

(21) Appl. No.: 14/291,167

(22) Filed: May 30, 2014

(65) Prior Publication Data
US 2014/0352581 A1  Dec. 4, 2014

(30) Foreign Application Priority Data

May 31, 2013  (EP) .................................... 13382206

(51) Int. Cl.
| | | |
|---|---|---|
| *F23J 15/02* | (2006.01) | |
| *B01D 53/96* | (2006.01) | |
| *B01D 53/62* | (2006.01) | |
| *B01D 53/83* | (2006.01) | |

(52) U.S. Cl.
CPC .............. *F23J 15/02* (2013.01); *B01D 53/62* (2013.01); *B01D 53/83* (2013.01); *B01D 53/96* (2013.01);
(Continued)

(58) Field of Classification Search
CPC ........ B01D 53/62; B01D 53/73; B01D 53/96; B01D 53/1475; B01D 2257/504;
(Continued)

(56) References Cited

U.S. PATENT DOCUMENTS 5,378,443 A * 1/1995 Engstrom ............ B01D 53/508
423/239.1
6,494,153 B1 * 12/2002 Lyon ........................ C10J 3/725
110/233
(Continued)

FOREIGN PATENT DOCUMENTS

EP  2299176 A1  3/2011

OTHER PUBLICATIONS

Galloy et al, "Post-combustion CO2 capture experiments in a 1 MWth carbonate looping pilot", VGB PowerTech 6, 2012, pp. 33-37.
(Continued)

*Primary Examiner* — David J Laux
(74) *Attorney, Agent, or Firm* — Hayes Soloway PC (57) ABSTRACT

This invention relates to a system for $CO_2$ capture from a combustion flue gas using a $CaO/CaCO_3$ chemical loop, wherein the $CO_2$ is captured from large scale combustion systems using CaO as regenerable $CO_2$ sorbent, where CaO particles are carbonated in contact with a flue gas at around 650° C. to later release pure $CO_2$ when supplied with sufficient heat for $CaCO_3$ calcination at around 900° C., wherein the system of this invention is characterized by a first direct heat exchange from a high temperature flue gas to a recirculation stream of calcined solids from the calciner and/or a second direct heat exchange from a flue gas to the carbonated solids arriving to the calciner, thereby reducing the heat requirements for calcination.

9 Claims, 2 Drawing Sheets

(52) U.S. Cl.
CPC .. *B01D 2251/404* (2013.01); *B01D 2257/504* (2013.01); *B01D 2258/0283* (2013.01); *Y02C 10/04* (2013.01); *Y02E 20/326* (2013.01); *Y02E 50/12* (2013.01)

(58) Field of Classification Search
CPC .......... F23C 10/01; F23C 13/00; Y02C 10/04; Y02C 10/06; Y02P 20/152
See application file for complete search history.

(56) References Cited

U.S. PATENT DOCUMENTS

| | | | |
|---|---|---|---|
| 2010/0050654 A1* | 3/2010 | Chiu | C10J 3/54 60/780 |
| 2010/0086456 A1* | 4/2010 | Epple | B01D 53/08 423/230 |
| 2012/0175136 A1* | 7/2012 | Trevino Villareal | B01D 53/62 166/402 |
| 2012/0219481 A1 | 8/2012 | Sceats et al. | |

OTHER PUBLICATIONS

Berstad et al, "Post-combustion CO2 capture from a natural gas combined cycle by Ca0/CaCO3 looping", International Journal of Greenhouse Gas Control 11, 2012, pp. 25-33.

Abanades et al, "Fluidized Bed Combustion Systems Integrating Co2 Capture with Ca0", Environ. Sci. Technol. 39, 2005, pp. 2861-2866.

Martinez et al, "Conceptual design of a three fluidised beds combustion system capturing CO2 with CaO", International Journal of Greeenhouse Gas Control 5, 2011, pp. 498-504.

Martinez et al, "Kinetics of Calcination of Partially Carbonated Particles in a Ca-Looping System for CO2 Capture", ACS Publications, American Chemical Society 2012, pp. 1432-1440.

Romano et al, "Application of the Sorption Enhanced-Steam Reforming process in combined cycle-based power plants", ScienceDirect, Energy Procedia 4, 2011, pp. 1125-1132.

* cited by examiner

SYSTEM FOR $CO_2$ CAPTURE FROM A COMBUSTION FLUE GAS USING A CAO/CACO₃ CHEMICAL LOOP

FIELD OF THE INVENTION

This invention relates to a system for $CO_2$ capture from a combustion flue gas using a $CaO/CaCO_3$ chemical loop, wherein the $CO_2$ is captured from large scale combustion systems using CaO as regenerable $CO_2$ sorbent, where CaO particles are carbonated in contact with a flue gas at around 650° C. to later release pure $CO_2$ when supplied with sufficient heat for $CaCO_3$ calcination at around 900° C. The system of this invention is characterized by a first direct heat exchange from a high temperature flue gas to a recirculation stream of calcined solids from the calciner and a second direct heat exchange from a flue gas to the carbonated solids arriving to the calciner, thereby reducing the heat requirements for calcination. Part of the flue gas used in the second heat exchange operation is the flue gas resulting from the first direct heat exchange operation. The flue gas resulting from the second heat exchange operation is fed to the carbonator reactor for $CO_2$ capture and for the formation of the carbonated solids.

DESCRIPTION OF THE PRIOR ART

The use of fossil fuels or biomass for power generation with $CO_2$ capture and permanent geological storage is widely recognized as a major mitigation option of climate change. Although a range of mature technologies exist for large scale $CO_2$ separation or capture, they are all relatively costly and/or energy consuming. There is a need of advanced technologies for $CO_2$ capture in the power sector and in several industrial sectors (cement, steel, refineries etc) so that these processes can deliver a pure stream of $CO_2$ at lower cost and lower energy penalties.

One particular type of advanced $CO_2$ capture technology makes use of a $CaO/CaCO_3$ reversible reaction or chemical loop, and is known as the Ca-looping $CO_2$ capture system or carbonate looping. In postcombustion applications of these Ca-looping systems, the flue gas from a power plant or other industrial emitter is first put in contact with CaO to absorb $CO_2$ and form $CaCO_3$ in a carbonator reactor that emits a flue gas with a reduced content of $CO_2$. The stream of carbonates solids containing $CaCO_3$ is calcined in a circulating fluidized bed calciner reactor burning a fuel with a mixture of $O_2/CO_2$ at a temperature around or above 900° C. in an atmosphere of concentrated $CO_2$. The basic Ca-looping process concept was published by T. Shimizu, et al "A twin bed reactor for removal of $CO_2$ from combustion processes", Trans I Chem E, 77A, 1999 and has experienced a fast development in recent years up to the pilot experiments at the MW scale (see for example Sanchez-Biezma et al, "Testing postcombustion $CO_2$ capture with CaO in a 1.7 MWt pilot facility", Energy Procedia 2013). In these pilot experiments, the circulating fluidized bed carbonator reactor and circulating fluidized bed calciner reactor have been interconnected in order to establish a solid flow of carbonated solids from the carbonator to the calciner, an equivalent solid flow of calcined solids from the calciner to the carbonator, a recirculation flow of carbonated solids leaving the carbonator and entering the carbonator and a recirculation flow of calcined solids leaving the calciner and entering the calciner. The two recirculation solid streams have been set up in order to increase the residence time and inventories of solids in the risers of the carbonator and calciner reactors, as it is common practice in the state of the art of other circulating fluidized bed systems. The split of the solids leaving each of the reactors into an stream of recirculating solids and a stream of solids circulating to the other reactor can be achieved with state of the art devices (double loop seals or other devices to split solid flows in standpipes) or can be arranged to be associated to different cyclones connected to the risers (one or more cyclones would direct the recirculating solids back to the same reactor while other or others cyclones would direct the solids to the other reactor).

The potential advantages of Calcium looping technology relies, among others, on the good opportunities for heat integration with the steam cycle of a power plant, which leads to reduced overall energy penalties. Other advantages are the low cost of the sorbent precursor (natural limestones); the potential use of CaO purges for cement manufacture or for desulfurization or for other large scale uses of Ca materials; the low toxicity of the materials involved; the possibility to co-capture $SO_2$ in the system, etc. It is also an advantage for the scaling up of Ca-looping technology the close similarity of the key elements in the technology (circulating fluidized bed carbonator and calciner reactors) with existing circulating fluidized bed combustors already developed up to industrial scale for solid fuels. It is also known in the state of the art that postcombustion Calcium looping can also be applied to flue gases coming from natural gas combined cycles (Berstad, D., Anantharaman, R., Jordal, K. Int. Journal of Greenhouse Gas Control 2012, 11, 25) as the low partial pressures of $CO_2$ typical in these flue gases can be increased with a flue gas recycle, as applied to other postcombustion $CO_2$ capture process routes.

Despite the previous inherent advantages of Ca-looping postcombustion systems, it has to be pointed out that the system proposed by Shimizu et al still has a substantial drawback as it requires a large consumption of pure $O_2$ to burn the fuel used in the oxyfired calciner to supply the necessary heat for calcination of $CaCO_3$. Pure $O_2$ is produced today at large scale from cryogenic methods, that are relatively expensive and energy consuming. It is evident that there will be competitive advantages for advanced Calcium looping systems where the energy requirements for calcination are minimized and the $O_2$ consumption is reduced or even made unnecessary. With this objective, conceptual processes have been described (Fluidized Bed Combustion Systems Integrating $CO_2$ Capture with CaO. Abanades, J. C.; Anthony, E. J.; Wang, J.; Oakey, J. E. Environ. Sci. Tech. 2005, 39 (8), 2861) in which the $CaCO_3$ regeneration heat is transferred indirectly through a metallic wall from the combustion chamber itself, assisted by the use of steam and/or vacuum in the calciner, and requiring no oxygen supply to the calciner. However these processes are complex and they may require special materials to transfer heat from the combustion chamber to the calciner, as yet not developed. An alternative discussed in this same publication is the circulation through the combustion chamber of a solid acting as heat carrier, transporting heat from the combustion chamber to the calciner. However, when the solid is a heat carrier different to CaO (alumina, sand etc) there is complex separation step (solid segregation) required between the solid heat carrier and the sorbent. When the heat carrier is the sorbent itself (mainly CaO, $CaSO_4$ and ashes as analysed in (Martinez, I., Murillo, R., Grasa, G., Rodriguez, N., Abanades, J. C. Int. Journal of Greenhouse Gas Control 2011, 5, 489), there is a need to operate at unusually high combustion temperatures in the combustion chamber in order to supply the necessary heat for calcination with reasonable values of solid circulation rates in circulating fluidized bed combustors. However, these high temperatures may induce some problems known to be linked to ash softening, increased $NO_x$ emissions and they are known to have a negative effect on the sorbent activity towards $CO_2$ capture when CaO particles reach temperatures higher than 950° C. All these problems will therefore be reduced if there is a substantial reduction in the heat requirements in the calciner so that the temperature of overheated solids transferring heat to the calciner can be reduced.

It is known in the prior art that the heat requirements in the calciner of a Ca-looping system are largely increased by the need to heat up the carbonated solid stream coming from the carbonator to the calciner. In an attempt to reduce these heat requirements, US2010/0086456A1 uses an indirect heat transfer concept transferring heat indirectly through a wall as in Abanades et al 2005 referred above, with the novelty of using heat pipes to transfer heat to the carbonated solids circulating from the carbonator to the calciner. The heat sources for such a heat transfer operation are the high temperature solids and high temperature gases abandoning the calciner and the combustion chamber. A drawback of these indirect heat transfer concepts through a heat conducting wall separating at least one fluidized solid stream from another fluidized bed or gas streams, is that the operation will require large heat transfer areas, leading to complex, large and costly heat transfer equipment.

Sceats and Dindsdale (US2012/0219481A1) disclose a novel Ca-looping, in which heat from a high pressure carbonation stage (at temperature slightly over the calciner temperature) is transferred (again indirectly through a wall) to the calciner to partially drive the calcination reaction of $CaCO_3$. They use a modest temperature difference between the carbonator and calciner. Therefore, important practical problems can be anticipated for this heat transfer stage as the required heat transfer surface must be very large to allow required heat transfer for the highly endothermic calcination of $CaCO_3$.

In summary, there is no well established practical solution for the continuous calcination of a large flow of carbonated solids containing $CaCO_3$, other than the use of oxycombustion in a calciner, using a substantial flow of pure $O_2$, because the heat requirements for calcination and for the heating up of the carbonated solids are very high and need to be supplied to a very high temperature calciner reactor (typically operating around 900° C.).

It is also important for the subject of this invention to note that it has recently been reported (I. Martinez, et al, Kinetics of Calcination of Partially Carbonated Particles in a Ca-Looping System for CO2 Capture, Energy Fuels 26 (2012) 1432-1440) that the calcination of partially carbonated solids from calcium looping systems can be completed in very short times (about one order of magnitude lower than those measured under identical conditions for limestone particles with identical particle size).

It is also important for the subject of this invention to consider the state of the art of common commercial operations intended to preheat solids by direct heat transfer from a high temperature flue gas. For example, limestone type materials in powdered form as those used in cement manufacture are routinely preheated in direct contact with high temperature gases. As an example, this principle is exploited in suspension preheaters located in many cement plants and similar industries, including novel cement plant concepts that are fed by CaO purges from a Calcium looping system (US2012/0175136A1). In such suspension preheater devices, a high temperature flue gas stream is put in contact with a lower temperature solid stream just before the entry point of a cyclone gas-solid separator device. The gas and the solids leave the cyclone separately but virtually at the same temperature, despite their very short contact time (in the order of the second). Several cyclones arranged in series and in countercurrent flow mode for the solids and gases, allow for an effective heat recovery from the flue gas leaving the series of suspension preheaters.

There is one application proposed in the state of the art of this scheme that consists in the use of the high temperature gas stream leaving the calciner (at over 900° C. and rich in $CO_2$) as the heat source for direct heat transfer to the carbonated solids (Romano M. et al. Application of the Sorption Enhanced-Steam Reforming process in combined cycle-based power plants. Energy Procedia 4 (2011) 1125-1132).

Cyclones in series resembling those existing in suspension preheaters mentioned above are used for this purpose. The high concentration of $CO_2$ in the gases leaving the calciner prevents the calcination of $CaCO_3$ contained in the carbonated solids flowing from the carbonator to the calciner. However, a mass and heat balance on this heat transfer operation reveals that the large flow of carbonated solids (that includes $CaCO_3$, CaO, $CaSO_4$ and ash) can only be heated up moderately by the much smaller mass flow of hot gases leaving the calciner at just over 900° C. There is a logical trend to minimize the need of a $CO_2$ recycle in oxyfuel calciners that will further reduce the availability of useful heat in this flue gas stream.

The previous review of the state of the art indicates that despite the theoretical advantages of the calcium looping systems using indirect heat transfer methods to reduce the heat requirements in the calciner, or the partial solution offered by direct heat transfer from the $CO_2$ stream leaving the calciner, there is today no system to efficiently and economically reduce the energy requirements in the calciner of a calcium looping system, and hence the consumption of pure $O_2$ in such calciner. Although it is evident that bringing the temperature of the different mass streams arriving to the calciner as close as possible or above the calcination temperature will reduce these energy requirements, there is no totally acceptable technical solutions available to exchange heat to the calciner or to the large solids streams arriving to the calciner. The system of this invention provides an integrated solution for this challenge. The solution provided in this invention allows for new power generation systems with $CO_2$ capture by Calcium looping that could be more economic and competitive by drastically reducing, or totally avoiding, the consumption of pure $O_2$ in the calciner of a Calcium looping $CO_2$ capture system.

SUMMARY OF THE INVENTION

This invention refers to a system to capture $CO_2$ from a combustion flue gas using a $CaO/CaCO_3$ chemical loop comprising at least the following elements:
i) one or more combustion chamber burning a fuel with air and generating a high temperature flue gas, wherein at least a combustion chamber is connected to a carbonator by means of a first pipe,
ii) a second pipe supplying a solid stream rich in CaO to the carbonator to react with the $CO_2$ contained in the high temperature flue gas and form carbonated solids,
iii) a third pipe to extract from the carbonator the carbonated solids and the high temperature flue gas depleted in $CO_2$, iv) a first cyclone connected to the carbonator by means of the third pipe, with said first cyclone separating the high temperature flue gas depleted in $CO_2$ from the carbonated solids, v) a calciner being fed with carbonated solids by means of a fourth pipe, vi) a fifth pipe to extract the calcined solids and $CO_2$ rich gases generated in the calciner, when supplied with heat to rise the temperature of the carbonated solids entering through the fourth pipe and drive the endothermic calcination of $CaCO_3$, vii) a second cyclone connected to the calciner by means of the fifth pipe for separating the $CO_2$ rich gas from the calcined solids wherein the system further comprises:
at least one additional cyclone to put in direct contact the high temperature flue gas stream generated in the combustion chamber with the calcined solids generated in the calciner and/or with the carbonated solids feeding the calciner, thereby reducing the heat requirements for calcination.

Optionally, the additional cyclone is a third cyclone, wherein the system further comprises:

viii) a sixth pipe supplying the high temperature flue gas generated in the combustion chamber to the third cyclone, ix) a seventh pipe supplying part of the calcined solids from the second cyclone, to the sixth pipe, wherein the high temperature flue gas generated in the combustion chamber and the calcined solids form the second cyclone are mixed before entering the third cyclone, the calcined solids being overheated by the high temperature flue gas, x) the third cyclone separating the overheated calcined solids from the high temperature flue gas, and xi) an eighth pipe returning overheated calcined solids to the calciner from the third cyclone.

As explained above, one of the objects of the system of this invention is to take heat directly from the high temperature flue gases generated in the combustion chamber and direct this heat towards the calciner by means of the recirculation stream of calcined solids from the calciner. The objective of such heat transfer exercise is to heat up in the third cyclone the recirculation stream of calcined solids to a temperature above the calciner temperature so that these solids can transport the heat necessary to drive the calcination reaction of $CaCO_3$ and heat up other mass streams that enter the calciner at temperatures below the calcination temperature. In these conditions, it is particularly important to minimize the heat requirements in the calciner. Therefore, a second objective of the system of this invention is to increase the temperature of the carbonated solid stream entering the calciner. To achieve this objective the additional cyclone is a fourth cyclone, wherein the system further comprises:

xii) a ninth pipe supplying the high temperature flue gas generated in the combustion chamber to the fourth cyclone.

xiii) a tenth pipe supplying carbonated solids from the first cyclone to the ninth pipe, wherein the high temperature flue gas generated in the combustion chamber and the carbonated solids from the first cyclone are mixed before entering the fourth cyclone xiv) the fourth cyclone separating overheated carbonated solids from the high temperature flue gas coming in the ninth pipe and send them to the calciner, and xv) an eleventh pipe supplying the flue gas from the fourth cyclone to the carbonator, It is convenient for the purpose of this invention to have a very high temperature flue gas entering the third cyclone through the sixth pipe, and/or through the fourth cyclone through the ninth pipe. This high temperature flue gas can be generated by adiabatic combustion of a fuel with air in a separated second combustor or it can be part or all of the flue gas generated in the first combustor, as long as this flue gas is at suitably high temperature for the purpose of the invention. When using separate combustors instead of a single one, different fuel and different combustion conditions can be used in each combustor.

The system of this invention is also intended to take heat directly from the high temperature flue gases generated in the combustion chamber and direct this heat towards the calciner using the circulating stream of carbonated solids from the carbonator entering the calciner. The objective of such heat transfer exercise is to heat up in the fourth cyclone the solid circulation stream of carbonated solids to a temperature as close as possible to the maximum decomposition temperature of $CaCO_3$ under the gas-solid contact conditions in such cyclone. A conservative assumption for the temperature of the overheated stream of carbonated solids would be the equilibrium decomposition temperature of $CaCO_3$ (750° C.-780° C.) under the $CO_2$ partial pressures in the flue gases that abandons the combustion chamber. However, since the characteristic gas-solid contact times and the characteristic gas-particle heat transfer times can be very small compared to the kinetics of the decomposition $CaCO_3$ particles, it is theoretically possible overheat the carbonated particles in the cyclone above the equilibrium decomposition temperature of $CaCO_3$ under the $CO_2$ partial pressure in the flue gases that abandons the combustion chamber. In these conditions, the carbonated particles could be theoretically heated up and separated from the flue gas at temperatures approaching the decomposition temperature of $CaCO_3$ in pure $CO_2$ at atmospheric pressure (900° C.) because these separated particles would be surrounded by a rich $CO_2$ atmosphere created by the decomposition of $CaCO_3$ in the small void volumes that accompany the solid stream of particles. However, it will be beneficial for the purpose of the invention to generate flue gases fed to the fourth cyclone with a high partial pressure of $CO_2$ (for example by using a fuel with high carbon content and combustion conditions close to stoichiometric) in order to maximize the equilibrium decomposition temperature of $CaCO_3$ in such flue gas. Under some circumstances, if a separate combustor is used to supply flue gas to the third cyclone, it could even be economic to burn the fuel with a low cost flow of oxygen enriched air, so that the temperature at which the carbonates solids are heated is higher without relevant carbonate decomposition.

The same heat transfer operation carried out at pressures above the atmospheric would allow higher preheating temperatures in the carbonated solids as the equilibrium temperature for the decomposition of $CaCO_3$ increases rapidly with the $CO_2$ partial pressure.

Another potential improvement, in order to minimize the fuel consumption dedicated to the preheating of carbonated solids in the device of the system of this invention, is to increase the number of heat exchange stages (as those described with the third and fourth cyclones) so that the exit temperature of the cooled flue gas is closer to the inlet temperature of the carbonated solids.

In addition, the carbonated solids stream could be put in direct contact with the $CO_2$ generated in the calciner in an additional heat exchanging step similar to the one taking place in the fourth cyclone, bringing the temperature of the carbonated solids closer to the calciner conditions.

In any of the previous cases, the system of this invention can supply to the calciner an overheated stream of carbonated solids at temperatures between 750-900° C., preferably between 750-800° C. This reduces the heat requirements in the calciner to achieve necessary calcination of $CaCO_3$. Furthermore, this reduction of the heat requirements in the calciner translates into a reduction of the high temperature flue gas required to heat up the overheated calcined solids transporting heat to the calciner, thereby reducing the requirements of CaO to capture $CO_2$ in the carbonator and hence the flow of carbonated solids generated in the carbonator and entering the calciner.

The system of this invention can yield a substantial reduction of the energy requirements in the calciner irrespective of the particular calciner design. When the calciner is based on the oxycombustion of coal in the calciner, there will be a substantial reduction in $O_2$ and fuel consumption in the calciner. When the calcination of carbonated solids is driven by indirect heat transfer from a combustion chamber (e.g. through circulating solids or metallic walls) the design of the calciner can be simplified as a result of the reduced heat requirements. This can lead to several embodiments of the invention and to other variants for other calcium looping schemes that should be evident for a skilled person in the art when using the teachings of the present invention.

BRIEF DESCRIPTION OF THE DRAWINGS

A set of drawings is attached wherein, with illustrative and non-limiting character, the following has been represented.

DETAILED DESCRIPTION OF THE PREFERRED EMBODIMENTS

This invention refers to a system to capture $CO_2$ from a combustion flue gas using a $CaO/CaCO_3$ chemical loop. A preferred embodiment of the system disclosed in this invention is represented in FIG. 1 and is intended for the combustion of a fuel to generate useful heat, comprising the following elements:

i) a first combustion chamber (50) burning a fuel (14) with air (15) and generating a flue gas stream that is directed to a carbonator (51) by means of a first pipe (1). The system also comprises heat transfer equipment to a steam cycle and auxiliary equipment to make use of the heat released in the system in such steam cycle (not shown in the FIG. 1 for simplicity) as well as all the ancillary equipment characteristic of large scale power plants and industrial uses of large scale combustors.
ii) a second pipe (2) supplying a solid stream rich in CaO to the carbonator (51) to react with the $CO_2$ contained in the flue gas and form carbonated solids, a third pipe (3) to extract from the carbonator (51) the carbonated solids and the flue gas depleted in $CO_2$ and a fourteenth pipe (17) to supply a fresh make up of limestone to the carbonator (51),
iii) a first cyclone (53) connected to the carbonator (51) by means of the third pipe (3), that separates the flue gas depleted in $CO_2$ (16) and discharges carbonated solids,
iv) a calciner (52) being fed with carbonated solids by means of a fourth pipe (4),
v) a fifth pipe (5) to extract the calcined solids and $CO_2$ rich gases generated in the calciner (52), a fifteenth pipe (18) to extract solid purges from the calciner (52). The calciner (52) is fed by a fuel (19) and a $O_2/CO_2$ mixture (20) when needed.
vi) a second cyclone (54) connected to the calciner (52) by means of the fifth pipe (5) for separating the $CO_2$ rich gas (13) from the calcined solids wherein the system further comprises at least;
vii) a sixth pipe (6) supplying a part of the high temperature flue gas generated in the combustion chamber (50) to a third cyclone (55),
viii) a seventh pipe (7) supplying part of the calcined solids from the second cyclone (54) to the sixth pipe (6) so that they are overheated by the high temperature flue gas,
ix) the third cyclone (55) separating the overheated calcined solids from the high temperature flue gas, and
x) an eighth pipe (8) returning overheated calcined solids to the calciner (52) from the third cyclone (55), In a variant of this system shown in FIG. 2, the high temperature flue gas entering the third cyclone (55) through sixth pipe (23) comes from a second combustion chamber (57) operated in adiabatic conditions. In another variant (not shown in the Figures), there are two cyclones separating calcined solids and gases from the calciner (52), one recirculating solids to the calciner (52) through seventh pipe (7) and one circulating solids to the carbonator (51) through the second pipe (2).

Figure 1:
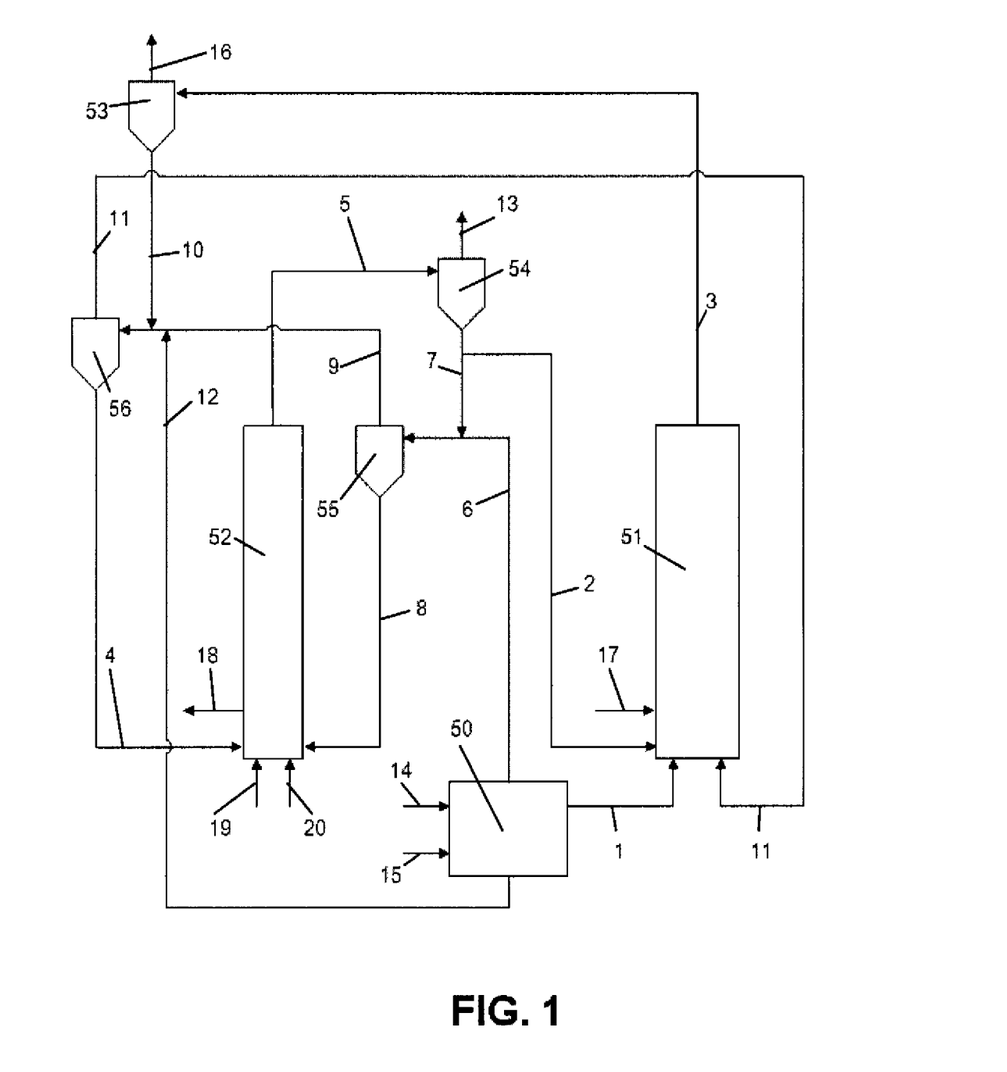
FIG. 1: shows a preferred embodiment of the Calcium looping system of this invention.

The system of the FIG. 1 can yield a substantial reduction of the heat requirements in the calciner (52) if the temperature of the carbonated solids entering the calciner (52) through the fourth pipe (4) has been brought closer to the calcination temperature. Therefore, the system further comprises:
xi) a ninth pipe (9) supplying the flue gas from the third cyclone (55) to a fourth cyclone (56),
xii) a tenth pipe (10) supplying carbonated solids from the first cyclone (53) to the ninth pipe (9),
xiii) a fourth cyclone (56) to separate overheated carbonated solids from the flue gas coming in the ninth pipe (9) and send them to the calciner (52) through the fourth pipe (4),
xiv) an eleventh pipe (11) supplying the flue gas separated in the fourth cyclone (56) to the carbonator (51), and optionally
xv) a twelfth pipe (12) supplying a fraction of the high temperature flue gas generated in the combustion chamber (50) to the ninth pipe (9).

The reduction in heat requirements in the calciner (52) by the increase of the inlet temperature of carbonated solids translates into a substantial reduction in the energy requirements in the calciner (52). As will be detailed in the example of the invention, there are reasonable operation conditions in which the consumption of fuel (19) and $O_2/CO_2$ (20) in the calciner (52) can be even be brought to zero by increasing the temperature of the carbonated solids entering the calciner (52) and by increasing the temperature and the recirculation flow of calcined solids that are heated in the third cyclone (55).

However, as will be shown in such particular example of the invention, in this extreme application of the previous system, very high temperature flue gases are required to contact the recirculating calcined solids in the third cyclone (55). These high temperature flue gases may not be available in existing coal power plants. A typical temperature at the exit of the main combustion chamber (50) in coal fired pulverized combustor is between 1000-1300° C. In this case, the heat content of the flue gas may just be sufficient to arrange for heat transfer towards carbonated solids in the fourth cyclone (56) with no heat available to overheat the calcined solids in the third cyclone (55). In these conditions a certain consumption of fuel (19) and $O_2/CO_2$ (20) in the calciner (53) has to be accepted. A second solution (not shown in the FIG. 1 for simplicity but shown in a part of FIG. 2) would be to dedicate an additional combustion chamber for the purpose of generating a higher temperature flue gas (6) to heat up the recirculating stream of CaO in the third cyclone (55).

There is a tendency described in the state of the art of some natural CaO materials to sinter and loss $CO_2$ carrying capacity when submitted at temperatures well over 950° C. If this was a maximum temperature limit for the solids present in the system, a variant of the system of FIG. 1 could not make use of the heat transfer operation in the third cyclone (55). The flue gas stream through the sixth pipe (6) would be zero, part of the calcined solids (7) would be entering the calciner (52) through the eighth pipe (8). Therefore, in this configuration of the system, heat is only transferred to the carbonated solids in the fourth cyclone (56). For this purpose, the twelfth pipe (12) is supplying flue gas that enters into contact with carbonated solids (10) before the fourth cyclone (56). The combustion of a certain flow of fuel in $O_2$ would be required in these conditions in the calciner (52).

Figure 2:
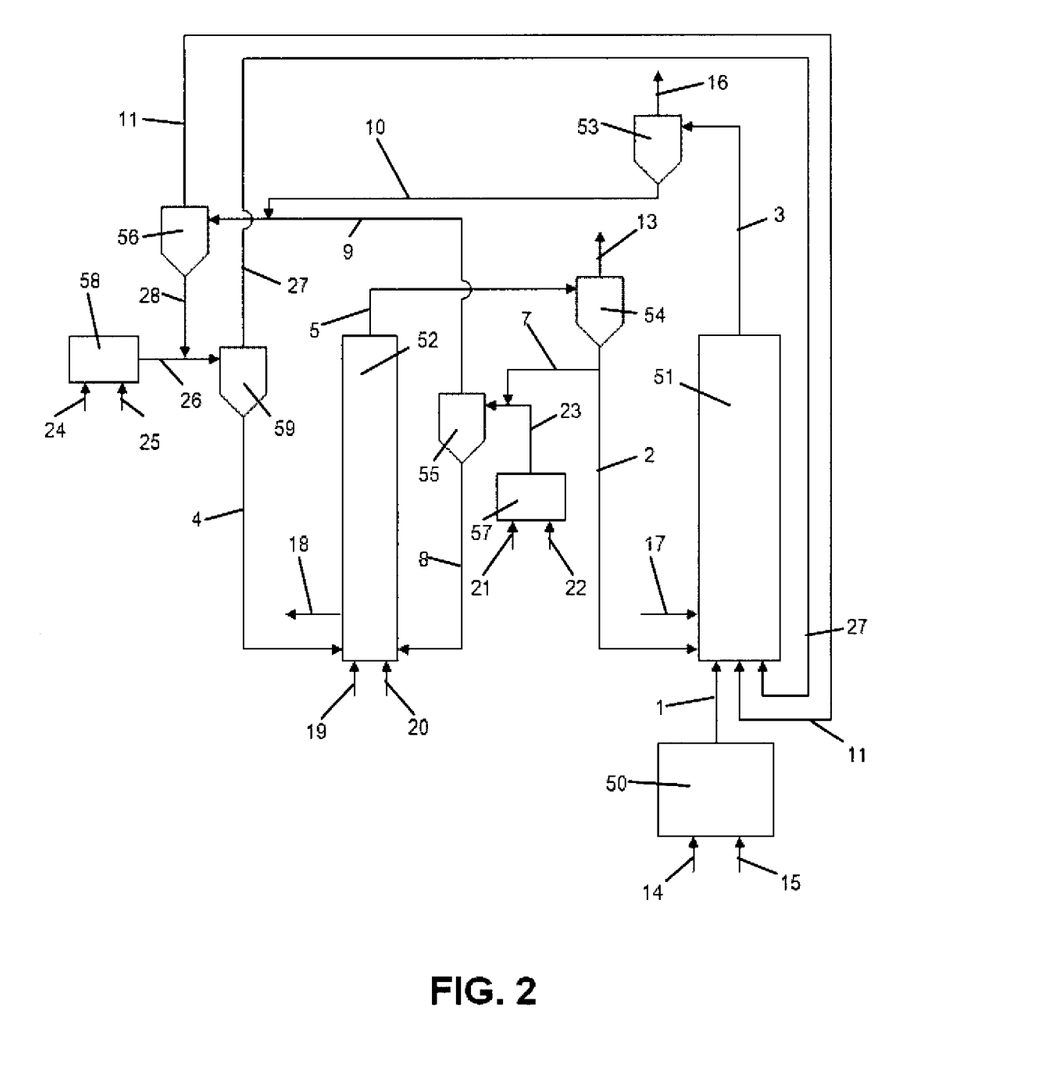
FIG. 2: shows another preferred embodiment of the Calcium looping system of this invention, applied to an existing power plant burning natural gas in a combined cycle.

It is also interesting to consider more demanding situations where the system of this invention is applied to existing power plant that supplies low temperature flue gas to the carbonator (51) but cannot be re-arranged to supply high temperature flue gases for the third (55) or fourth (56) cyclones of FIG. 1. Taking into consideration the previous discussion, a second preferred embodiment of the system disclosed in FIG. 1 is presented in FIG. 2. This is intended for application to an existing combustion power plant comprising:

xvi) a first combustion chamber (50) burning a fuel (14) with air (15) supplying low temperature flue gases to the carbonator (51). In this configuration, no heat is available in the flue gas generated in the first combustion chamber (50) to overheat carbonated solids, or calcined solid streams, xvii) a second combustion chamber (57) burning a fuel (21) with air (22) feeding a high temperature flue gas (23) to the third cyclone (55), using the flue gas leaving the third cyclone (55) to partially overheat carbonated solids in the fourth cyclone (56) as explained above for the preferred embodiment represented in FIG. 1, xviii) a third combustion chamber (58) burning a fuel (24) with air (25) supplying a high temperature flue gas (26)

xix) a fifth cyclone (59) receiving the high temperature flue gas (26) from the third combustor (58) and partially overheated carbonated solids (28) from the fourth cyclone (56) and generating overheated carbonated solids (4) that are directed to the calciner (52)

xx) a thirteenth pipe (27) supplying the flue gas separated in the fifth cyclone (59) to the carbonator (51)

The flue gas from the second combustion chamber (57) allows for the direct heating of solids in the third cyclone (55) without the need to use for this purpose flue gas from the existing power plant. The third combustion chamber (58) and the fifth cyclone (59) allow reaching higher temperatures of the overheated carbonated solids, independently of the mass flow and temperature of the flue gas resulting from third cyclone (55). As noted above, burning in the third combustion chamber (58) fuels with high carbon content and/or air enriched with oxygen will facilitate higher overheating temperatures of the carbonated solids, thereby further reducing the heat requirements in the calciner (52).

As will be detailed in the example of the invention, the consumption of $O_2$ and fuel in the calciner (52) is reduced in the device of this invention respect to an equivalent case in the state of the art of calcium looping systems applied to existing power plants. One particular example is given below to illustrate a practical implementation of this preferred embodiment when the existing combustor system is a natural gas combined cycle with flue gas recycle. There will be other ways to operate the devices of this invention that will be obvious for the skilled in the art in view of the devices and methods disclosed in this invention. The resulting system will open a wider range of operating modes, that would add even more flexibility to power plants with $CO_2$ capture using the devices of this invention.

Similar devices can be designed following the teachings of this invention for precombustion $CO_2$ capture systems using CaO as a regenerable sorbent, calcium looping system with reactivation steps, calcium looping systems with energy storage by accumulating high temperature solids and low temperature solids, and calcium looping systems where the calcination heat is coming from an exothermic reaction of a second solid reacting in the system other than combustion of a fuel in $O_2$. Therefore, the description and examples provided in this invention are illustrative and of non-limiting character.

EXAMPLES

Example 1

Design Example of a Device as in FIG. 1

A conceptual design of a device a FIG. 1 is carried out below to illustrate its practical application. The operating conditions in the example have been chosen to show that it is possible to operate the calciner (52) without the need of a supply of fuel and $O_2$ to such calciner (52). Let us first assume a thermal input in the combustion chamber (50) of 100 MWt achieved by feeding coal (14) with a calorific value of 30 MJ/kg and a carbon content of 70% w. Assuming complete fuel combustion and a stoichiometric excess of air of 5%, a mass flow of 36.6 kg/s of flue gas will leave the combustor (50), with a $CO_2$ content of 16% volume, transporting a molar flow of $CO_2$ of 0.194 kmol/s.

For the operating conditions in the Ca-looping reactors, let us assume an operation temperature of 650° C. in the carbonator (51) and 915° C. in the calciner (52); a 90% $CO_2$ capture efficiency in the carbonator, with a molar $CO_2$ content of the solids leaving the carbonator (51) through third pipe (3) of 0.15 and a 20% w of inerts (including ashes and $CaSO_4$). This yields a total mass flow of solids leaving the carbonator (51) of 91.3 kg/s. Assuming a constant heat capacity of the solids circulating between carbonator (51) and calciner (52) of 1.0 kJ/kg ° C. and an enthalpy of the calcination reaction of 168 kJ/mol, a heat supply in the calciner (52) of at least 53.6 MW would be needed in order to heat up the stream of carbonated solid from 650 to 915° C. (24.2 MW) and to calcine the carbonate (29.4 MW) formed in the carbonator (51). Let us also assume that there is a make-up flow of fresh limestone fed to the carbonator (51) through a fourteenth pipe (17) in order to sustain the activity of the sorbent at 0.15. This is assumed at 0.1 mol of $CaCO_3$ per mol of $CO_2$ fed to the carbonator. The calcination of this limestone (assumed to be preheated to carbonator temperature before entering the carbonator (51)) requires a further heat supply to the calciner (52) of 3.3 MW.

In this particular example we also assume that the entire flue gas stream produced in the combustion chamber (50) is fed sequentially through pipes (6) and (9) and through twelfth pipe (12), before being sent to the carbonator (51) through eleventh pipe (11) and there is no flue gas fed from the combustion chamber (50) to the carbonator (51) through first pipe (1). For this specific example, we assume a conservative over heating temperature of 782° C. for the overheated carbonated solids through fourth pipe exiting the fourth cyclone (56), which is the equilibrium temperature of the $CaCO_3$ decomposition for the $CO_2$ partial pressure of the flue gas stream through ninth (9) coming from the combustion chamber (50). This will also be the temperature of the flue gases abandoning fourth cyclone and entering the carbonator (after suitable heat recovery not shown here for simplicity). Therefore an overall heat balance (to supply 53.6 plus 3.3 MW of sensitive heat from the 36.6 kg/s of flue gas leaving the combustor chamber (50)) allows to estimate the temperature required in the flue gases leaving the combustor at 1784° C., when assuming a heat capacity of 1.40 kJ/kg° C. for the flue gas produced in the combustion chamber (50) entering the third cyclone (55) to through sixth pipe (6) and 1.20 kJ/kg° C. for the flue gas leaving the fourth cyclone (56) through eleventh pipe (11). This is below the adiabatic combustion temperature of the fuel when air is preheated to 400° C. The thermal power required to increase the temperature of the carbonated solids from 650 to 782° C. is 12.1 MW. This is extracted from the flue gas fed to the fourth cyclone (56) through pipe (9). A heat balance in the calciner (52) reveals that by feeding overheated carbonated solids (4) to the calciner (52) the heat requirements in the calciner (52) are reduced to 44.8 MW which is a 21.1% lower than in the case with no preheating of the carbonated solid stream. This would translate into an equivalent reduction in fuel (19) and $O_2/CO_2$ consumption in the scheme of FIG. 1 as heat is only transferred to the carbonated solids in the fourth cyclone.

However, this example has been chosen to show that it is possible to operate the calciner (52) without the need of a supply of fuel and $O_2$ to such calciner (52). For this purpose, we further assume, in this particular example a design temperature of 1000° C. for the exit temperature of solid and gases from the third cyclone (55). On the other hand, a heat balance indicates that the supply of the 44.8 MW required in the calciner (52) with the overheated solid stream of recirculating solids to the calciner (52) requires 527 kg/s of recirculating solids through eighth pipe (8). This is 5.8 times the solid circulation between reactors. This recirculating flow of solids is high, but within the limits of what is feasible in state of the art of circulating fluidized bed technology. The operation of the calciner (52) with these high total solid circulation rates may require a design of the bottom part of the calciner with a large cross-section, in order to allow for sufficient bed inventory of solids and sufficient residence time (10 to 20 seconds) of the solids in the calciner. This will allow sufficient time for good mixing of the solids streams through eighth (8) and fourth pipe (4) and also achieve close to complete calcination, Similarly, the reduced cross-sectional area at the upper part of the calciner (52) will ensure a sufficiently high superficial gas velocity at the exit of the calciner (2-5 m/s) to transport solids out of the calciner (52) by entrainment.

Assuming a heat capacity of 1.25 kJ/kg° C. for the flue gas leaving the third cyclone (55) at 1000° C., a heat balance around the third cyclone reveals that a mass flow of 36.0 kg/s of flue gas from the combustion chamber (50) is needed to enter into the third cyclone (55). The flue gas leaving the third cyclone enters the fourth cyclone (56) through ninth pipe (9) and leaves the cyclone at the chosen temperature of for the overheated carbonated solids (782° C.), transferring 11.2 MW. There is a need in this heat balance of 0.9 MW, as required to complete the 12.1 MW needed for overheating the carbonated solid stream (4). This additional thermal power comes from a mass flow of 0.6 kg/s flue gas from the combustion chamber (50) at 1784° C. through twelfth pipe (12).

It will be evident for the skilled in the art to define other scenarios using other fuels and combustion conditions. The temperatures and solid circulation rates required to enter the third cyclone (55) of this example in order to close the heat balance in the calciner are relatively high, in particular the target temperature for overheated calcined solids (1000° C.) and the solid recirculation flow of these solids (527 kg/s of recirculating solids plus the 83.6 kg/s circulating between calciner and carbonator respect to a gas mass flow abandoning the calciner of 8.6 kg/s). There will be practical situations where these high temperatures and solid circulation conditions cannot be reached. In these conditions, there will not be sufficient heat available for the continuous calcination of the carbonated solids and this will require a reduction of the CO2 capture efficiency in the carbonator (51) or an additional heat supply to the calciner (52). This additional heat supply can come from state of the art oxycombustion of an additional fuel (19) in the calciner (52). The following example illustrates one of these possible cases.

Example 2

Conceptual Design of the Device of FIG. 2

A particular example of application of the system of this invention arises when considering its application to the case of an existing power plant comprising a first combustion chamber (50) generating a flue gas at low temperature through first pipe (1) entering the carbonator (51). Therefore, in these applications, there is no heat available for the calcium looping system from the flue gases generated in the main combustion chamber (1). Additional combustion chambers are needed to supply the hot flue gases of sixth (6) and twelfth (12) pipes of FIG. 1. The conceptual design of a preferred embodiment of the system of this invention to solve this particular case is represented in FIG. 2. In this particular example, a natural gas combined cycle, NGCC, is used to represent such power plant. Coal or biomass of other carbonaceous fuel combustion systems would follow a similar design procedure. In this particular example we use the same sorbent material, make up flow requirements and the same carbonation temperatures as in Example 1. However we impose several new restrictions and more conservative choices of variables in the calcium looping system: the $CO_2$ capture efficiency in the carbonator is 85% for the lower $CO_2$ content of flue gases derived from natural gas combustion; the temperature of calcination is 900° C., as the oxy-combustion of natural gas in the calciner (52) generates a large fraction of steam that facilitates the fast calcination of $CaCO_3$ at lower temperatures; the temperature of the overheated recirculation of CaO is limited to 950° to avoid possible enhanced deactivation of the CaO sorbent particles;

the solid recirculation of CaO in the calciner (52) is limited to a solid more conservative value of 250 kg/s, more similar to the existing in circulating fluidized bed combustors and associated cyclones with dimensions comparable to the carbonator reactor. Let us also assume a thermal input in the first combustion chamber (50) of 100 MWt achieved by feeding natural gas (14) (assumed here to be pure methane) with a calorific value of 50 MJ/kg. Assuming flue gas recycle in the NGCC and an overall complete fuel combustion with a stoichiometric excess of air of 5%, this produces a mass flow of 38.1 kg/s of flue gas leaving the combustor (50), with a $CO_2$ content of 9.1% volume, transporting a molar flow of $CO_2$ of 0.125 kmol/s.

For the operating conditions adopted in the Ca-looping reactors, a total mass flow of solids leaving the carbonator (51) of 53.8 kg/s (12.9 kg/s of $CaCO_3$ and 40.9 kg/s of CaO) is obtained (no inert solids present in this example). Using make up flow of 0.1 (as no ash or sulfur is present in the system as in Example 1), the heat balance in the calciner reveals a heat requirement in the calciner (52) of 35.1 MW, that would be needed in order to heat up the stream of carbonated solid stream from 650 to 900° C. (13.4 MW) and to calcine the carbonate (21.7 MW) formed in the carbonator (51). The calcination of this limestone (assumed to be preheated to carbonator temperature before entering the carbonator (51)) requires a further heat supply to the calciner (52) of 2.2 MW.

In this particular example, as shown in FIG. 2, we assume that a second combustor of natural gas (57) is installed to supply a high temperature flue gas (23) to enter in contact with the recirculating stream of CaO solids through the seventh pipe (7). For this specific example, we have fixed the solid recirculation flow at 250 kg/s so that the heat requirements to overheat this solid stream in the third cyclone from 900° C. to 950° C. are 12.5 MW. This must equal the thermal power of the second combustor, that can be obtained burning a flow of natural gas of 0.35 kg/s with 6.28 kg/s of air preheated at 400° C. The flue gas that abandons the third cyclone (55) at 950° (55) is directed to the fourth cyclone (56) to heat up the carbonated solid stream at 650° C. (10) up to a temperature of 691.4° C. In order to bring the temperature of this solids stream to the overheating temperature of 750° C. chosen for this example, a third combustor (58) is chosen to supply heat to a fifth cyclone (59). For simplicity, this combustor operates at temperature and air excess as in the second combustor, burning in this case a flow of natural gas of 0.08 kg/s and air of 1.39 kg/s. However, this small third combustor could be designed to target much higher overheating temperatures of the carbonated solids by burning a different fuel with a higher carbon content, by using comburents with higher $O_2$ content (enriched air) and/or by operating in a gas-solid contact mode to allow overheating of carbonated particles to temperatures over the equilibrium decomposition temperature of $CaCO_3$ in the flue gas $CO_2$ partial pressure and below the decomposition temperature of $CaCO_3$ in pure $CO_2$ at the pressure of the fifth cyclone (900° C. at atmospheric pressure).

In this particular example, the increase in the temperature of the carbonated solids from 650 to 750° C. in the fourth and fifth cyclones reduces in 5.4 MW the heat requirements in the calciner (52). The increase in the temperature of the recirculated calciner solids from 900 to 950° C. in the third cyclone reduces in 12.5 MW the heat requirements in the calciner (52). However, there is still a heat requirement in the calciner (52) of 19.4 MW. The closure of the heat balance of the calciner is achieved in this example using state of the art oxycombustion of natural gas (19) in the calciner (52) with a $O_2$—$CO_2$ comburent mixture (20). Although this will still require an air separation unit to run the calcium looping system of this invention, it will be evident for a person skilled in the art that the device of FIG. 2 and allows for a reduction of 45% in $O_2$ consumption in such calciner (52) respect to the state of the art application of Ca looping system of a NGCC power plant.

Other variants of the system of FIG. 2 and other choices of the conditions used in this particular example will be evident for the skilled in the art in order to further minimize or even make zero the $O_2$ demand in the calciner (52) of FIG. 2.

The invention claimed is:

1. System to capture CO2 from a combustion flue gas using a CaO/CaCO3 chemical loop comprising at least the following elements:
   i) one or more combustion chamber burning a fuel with air and generating a high temperature flue gas, wherein at least a combustion chamber is connected to a carbonator by means of a first pipe,
   ii) a second pipe supplying a solid stream rich in CaO to the carbonator to react with the CO2 contained in the high temperature flue gas and form carbonated solids,
   iii) a third pipe to extract from the carbonator the carbonated solids and the high temperature flue gas depleted in CO2,
   iv) a first cyclone connected to the carbonator by means of the third pipe, with said first cyclone separating the high temperature flue gas depleted in CO2 from the carbonated solids,
   v) a calciner being fed with carbonated solids by means of a fourth pipe,
   vi) a fifth pipe to extract the calcined solids and CO2 rich gases generated in the calciner, when supplied with heat to raise the temperature of the carbonated solids entering through the fourth pipe and drive the endothermic calcination of CaCO3,
   vii) a second cyclone connected to the calciner by means of the fifth pipe for separating the CO2 rich gas from the calcined solids wherein the system further comprises at least one additional cyclone to put in direct contact the high temperature flue gas stream generated in the combustion chamber with the calcined solids generated in the calciner and/or with the carbonated solids feeding the calciner, thereby reducing the heat requirements for calcination.

2. The system of claim 1, wherein the at least one additional cyclone comprises a third cyclone, and the system further comprises:
   i) a sixth pipe supplying the high temperature flue gas generated in the combustion chamber to the third cyclone,
   ii) a seventh pipe supplying part of the calcined solids from the second cyclone to the sixth pipe,
   wherein the high temperature flue gas generated in the combustion chamber and the calcined solids form the second cyclone are mixed before entering the third cyclone, the calcined solids being overheated by the high temperature flue gas,
   iii) the third cyclone separating the overheated calcined solids from the high temperature flue gas, and
   iv) an eighth pipe returning overheated calcined solids to the calciner from the third cyclone.

3. The system of claim 2, wherein the at least one additional cyclone further comprises a fourth cyclone, and the system further comprises:

i) a ninth pipe supplying the high temperature flue gas generated in the combustion chamber to the fourth cyclone,
ii) a tenth pipe supplying carbonated solids from the first cyclone to the ninth pipe,
wherein the high temperature flue gas generated in the combustion chamber and the carbonated solids from the first cyclone are mixed before entering the fourth cyclone,
iii) the fourth cyclone separating overheated carbonated solids from the high temperature flue gas coming in the ninth pipe and send them to the calciner, and
iv) an eleventh pipe supplying the flue gas from the fourth cyclone to the carbonator.

4. The system of claim 3, wherein the high temperature flue gas generated in the combustion chamber is supplied to the third cyclone by means of a sixth pipe before entering the ninth pipe that supplies the high temperature flue gas generated in the combustion chamber to the fourth cyclone.

5. The system of claim 4 further comprising:
i) a twelfth pipe supplying a fraction of the high temperature flue gas generated in the combustion chamber to the ninth pipe.

6. The system of claim 5 wherein the at least one additional cyclone further comprises a fifth cyclone, and the system further comprises:

i) a combustion chamber burning a fuel with air supplying low temperature flue gases to the carbonator,
ii) the fifth cyclone receiving the high temperature flue gas from a combustion chamber and the partially overheated carbonated solids from the fourth cyclone generating overheated carbonated solids that are directed to the calciner, and
iii) a thirteenth pipe supplying the flue gas separated in the fifth cyclone to the carbonator.

7. The system of claim 6 further comprising:
i) a fourteenth pipe to feed a make-up flow of fresh limestone to the carbonator.

8. The system of claim 7 further comprising:
i) a fifteenth pipe to extract solid purges from the calciner.

9. The system of claim 1 wherein the at least one additional cyclone feeds overheated calcined solids to the calciner by putting in direct contact the high temperature flue gas stream generated in the combustion chamber with the calcined solids generated in the calciner that return to the calciner and/or with the carbonated solids feeding the calciner, thereby reducing the heat requirements for calcination.

* * * * *

UNITED STATES PATENT AND TRADEMARK OFFICE
CERTIFICATE OF CORRECTION

PATENT NO. : 9,651,252 B2
APPLICATION NO. : 14/291167
DATED : May 16, 2017
INVENTOR(S) : Abanades Garcia et al.

It is certified that error appears in the above-identified patent and that said Letters Patent is hereby corrected as shown below:

In the Claims

Column 14, Claim 2, Line 57, "form" should be --from--.

Signed and Sealed this
Twenty-seventh Day of March, 2018

Andrei Iancu
*Director of the United States Patent and Trademark Office*